(12) United States Patent  
Tourrilhes et al.

(10) Patent No.: US 11,811,662 B2  
(45) Date of Patent: Nov. 7, 2023

(54) DETERMINATION OF AN INFLECTION POINT IN CONGESTION OF A NETWORK PATH

(71) Applicant: HEWLETT PACKARD ENTERPRISE DEVELOPMENT LP, Houston, TX (US)

(72) Inventors: Jean Tourrilhes, Palo Alto, CA (US); Puneet Sharma, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 274 days.

(21) Appl. No.: 17/282,765

(22) PCT Filed: Oct. 26, 2018

(86) PCT No.: PCT/US2018/057688  
§ 371 (c)(1),  
(2) Date: Apr. 4, 2021

(87) PCT Pub. No.: WO2020/086092  
PCT Pub. Date: Apr. 30, 2020

(65) Prior Publication Data  
US 2022/0006740 A1 Jan. 6, 2022

(51) Int. Cl.  
*H04L 47/11* (2022.01)  
*H04L 43/062* (2022.01)  
(Continued)

(52) U.S. Cl.  
CPC ............ *H04L 47/11* (2013.01); *H04L 43/062* (2013.01); *H04L 43/0882* (2013.01); *H04L 47/122* (2013.01); *H04L 47/283* (2013.01)

(58) Field of Classification Search  
None  
See application file for complete search history.

(56) References Cited

U.S. PATENT DOCUMENTS 5,936,940 A * 8/1999 Marin ................. H04L 12/5602  
370/465  
7,558,202 B2 7/2009 Luo et al.  
(Continued)

FOREIGN PATENT DOCUMENTS

KR 101493632 * 2/2015  
WO WO2020042018 * 3/2020

OTHER PUBLICATIONS

Airon, M. et al., "Bandwidth Estimation Tools and Techniques: A Review," 2017, 20 pages, http://www.preprints.org/manuscript/201710.0060/v1/download.  
(Continued)

*Primary Examiner* — Andre Tacdiran  
(74) *Attorney, Agent, or Firm* — Hewlett Packard Enterprise Patent Department (57) ABSTRACT

Determination of an inflection point in congestion in a network path can include determining packet congestion on a network path using an inflection point mechanism (IPDM), detecting a potential inflection point in response to a one-way delay (OWD) of a first packet being lesser than an OWD of a second packet by a quantity greater than a function of a difference of inter departure time (IDT) between the first packet and the second packet, and determining an inflection point in congestion of the network path based on the potential inflection point.

8 Claims, 5 Drawing Sheets

(51) Int. Cl.
  *H04L 43/0882* (2022.01)
  *H04L 47/122* (2022.01)
  *H04L 47/283* (2022.01)

(56) References Cited

U.S. PATENT DOCUMENTS

| | | | |
|---|---|---|---|
| 7,675,856 | B2 | 3/2010 | Padmanabhan et al. |
| 8,553,540 | B2 | 10/2013 | Mehrotra et al. |
| 2006/0227706 | A1 | 10/2006 | Burst, Jr. |
| 2007/0217448 | A1 | 9/2007 | Luo et al. |
| 2015/0092794 | A1 | 4/2015 | Aweya et al. |
| 2016/0057659 | A1* | 2/2016 | Hoshihara ......... H04W 28/0831 370/230 |
| 2016/0294536 | A1* | 10/2016 | Biederman ........... H04L 47/283 |
| 2016/0330012 | A1 | 11/2016 | Liu |
| 2018/0034740 | A1 | 2/2018 | Beliveau et al. |
| 2019/0140956 | A1* | 5/2019 | Shen ................... H04L 45/7453 |

OTHER PUBLICATIONS

Huang, Y-C et al., "JitterPath: Probing Noise Resilient One-Way Delay Jitter-Based Available Bandwidth Estimation," Jun. 2007, IEEE, pp. 1-15, https://homepage.iis.sinica.edu.tw/papers/lcs/2560-F.pdf.

Li, M., "Available Bandwidth Estimation for the Network Paths with Multiple Tight Links and Bursty Traffic," Jan. 2013, Journal of Network and Computer Applications, http://www.researchgate.net/publication/ 257489368_Available_bandwidth_estimation_for_the_network_paths_with_multiple_tight_links_and_bursty_traffic.

Paul, A. K. et al., "An Enhanced Available Bandwidth Estimation Technique for an End-to-End Network Path," May 2016, pp. 1-14, http://www.syslog.co.in/java-projects/networking-projects/An%20Enhanced%20Available%20Bandwidth%20Estimation%20Technique%20for%20an%20End-to-End%20Network%20Path.PDF.

Ribeiro et al., "PathChirp: Efficient Available Bandwidth Estimation for Network Paths", in Proceedings of 4th passive active measurement workshop, 2003, 11 pages.

Ribeiro, V., et al. "Pathchirp: A light-weight available bandwidth estimation tool for network-aware applications." Proceedings of 2003 LACSI Symposium. New Mexico: LACSI Press, 2003, 12 pages.

Strauss et al., "A Measurement Study of Available Bandwidth Estimation Tools," IMC'03, Oct. 27-29, 2003, 6 pages.

* cited by examiner

DETERMINATION OF AN INFLECTION POINT IN CONGESTION OF A NETWORK PATH

BACKGROUND

A network provides a communication system that directly or indirectly links two or more computers and/or peripheral devices and allows users to access resources on other computing devices and exchange messages with other users. A network can include, for example, a software-defined wide area network (SD-WAN), a local area network (LAN), a wireless local area network (WLAN), a virtual private network (VPN), the Internet, or the like, or a combination thereof.

Network bandwidth is a threshold rate of network data transfer across a given path. Put another way, network bandwidth is the capacity of a network communications link to transmit a threshold amount of data from one point to another over the network or other connection in a given amount of time (e.g., one second).

DETAILED DESCRIPTION

Network bandwidth measurements are used to determine how much of the network path capacity is available on a network path before deciding where to place and/or route and load balance network traffic. In a closed system, direct network bandwidth measurements are collected on network devices on network paths of network traffic in the closed system. However, direct network bandwidth measurements may not be used in some instances, such as when network devices are in different administrative domains or hidden by tunneling or encapsulation. This occurs, for instance, in an SD-WAN environment, where the SD-WAN gateway tries to direct traffic to a desired direct, encapsulated or tunneled path over the Internet. As used herein, a network device may include a computing device that is communicatively coupled or capable of being communicatively coupled to a computing network. For example, a network device may include a network controller, an access point, a data transfer device, etc.

When direct measurements are not possible, some approaches to bandwidth measurement include bandwidth estimation from endpoints that can be controlled for probes for bandwidth measurements. This can include probing a network path with probe packets sent from one end of the network path (sender) to the other end (receiver). The receiving end measures the receive time of the packets and changes to packet delays and/or time patterns to estimate network path characteristics such as a network path capacity, available bandwidth, and/or bulk transfer capacity, as will be discussed further herein.

Some approaches include the use of excursion detection mechanisms (EDMs) for measuring when a network path is in congestion. An EDM may be referred to as an inflection point detection mechanism (IPDM) because it may measure an inflection point where a network path goes from uncongested to congested during network path characteristics (e.g. available bandwidth) estimation. As used herein, the terms EDM and IPDM are considered interchangeable. The probe packets are sent at an increasing rate, and the inflection point is measured. In such an example, the IPDM may be sensitive to noise in packet timing, which can prevent the IPDM from finding an accurate inflection point, leading to inaccurate network path characteristics (e.g. available bandwidth) estimates (e.g., increased errors in the estimate).

For instance, in such approaches, an increase in a one-way delay (OWD) in a probe train (discussed further herein) during measurement may indicate increased congestion, but OWD measurements are noisy, which affects the accuracy of the indication. This noise is due to imperfections and non-ideal behaviors of various network elements and other packet scheduling constraints (e.g., packet batching). Such noise in the OWD measurements directly impacts the IPDM. For example, noisy OWD values may lead the IPDM to identify excursions where no congestion is happening. Noisy OWD values may also lead the IPDM to misidentify an inflection point, leading to inaccurate available bandwidth estimations. As used herein, an OWD, which is discussed further herein, includes the time taken by a packet to get from sender device to receiver device in a network path.

In contrast, examples of the present disclosure filter out packet timing noise and increase accuracy of inflection point determination and bandwidth estimations. For instance, OWD noise in an IPDM is mitigated by considering a probe packet as a potential inflection point only if the OWD increase is greater than a slope filter based on the packet's inter departure time (IDT). Additionally, examples of the present disclosure can compensate for packet batching issues that may cause OWD noise, resulting in increased accuracies of inflection point determination and bandwidth estimations.

By reducing noise and improving accuracies of inflection point determinations and bandwidth estimations, examples of the present disclosure improve network and network path performances. For instance, because bandwidth estimates are more accurate as compared to other approaches, better determinations are made about how many users and/or network devices may access the network efficiently. Network efficiency/utilization, as a result, improves. By better predicting network congestion (e.g., by determining an inflection point accurately), network slow-downs are reduced (e.g., backlog queues are reduced), which can increase user satisfaction, in addition to the improvement of the network device and network performances.

The figures herein follow a numbering convention in which the first digit corresponds to the drawing figure number and the remaining digits identify an element or component in the drawing. For example, reference numeral 342 refers to element "42" in FIG. 3 and an analogous element may be identified by reference numeral 442 in FIG. 4. Analogous elements within a figure may be referenced with a hyphen and extra numeral or letter. See, for example, elements 214-1, and 214-2 in FIG. 2. Such analogous elements may be generally referenced without the hyphen and extra numeral or letter. For example, elements 214-1 and 214-2 may be collectively referenced as 214. Elements shown in the various figures herein can be added, exchanged, and/or eliminated so as to provide a number of additional examples of the disclosure. In addition, the proportion and the relative scale of the elements provided in the figures are intended to illustrate the examples of the disclosure and should not be taken in a limiting sense.

Figure 1:
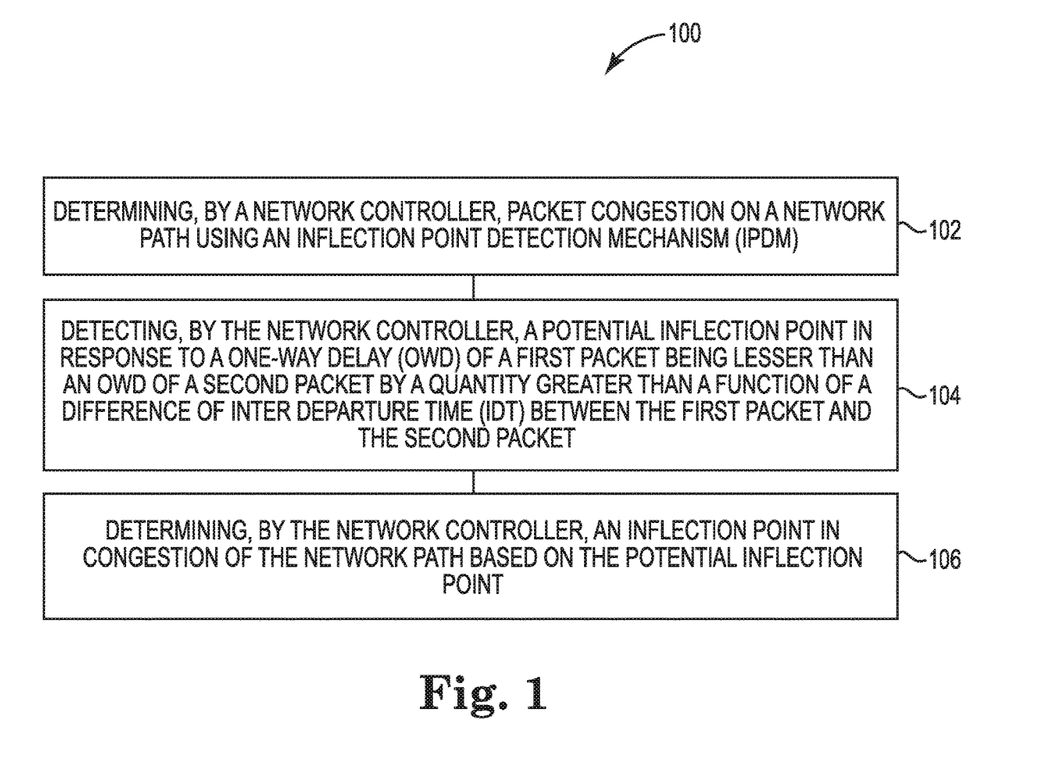
FIG. 1 illustrates an example method for determination of an inflection point in congestion of a network path consistent with the disclosure.

FIG. 1 illustrates an example method 100 for determination of an inflection point in congestion of a network path consistent with the disclosure. As used herein, an inflection point is a point where network path goes from uncongested to congested with network traffic. Put another way, an inflection point is a point where OWD of probe packets goes from relatively constant to consistently increasing, indicating congestion in the network path. In particular the probe packet from the probe sequence where the particular network path being probed goes from being uncongested to congested. Determining the inflection point can allow for estimation of network bandwidth because it can be determined how much network traffic the network can handle before congestion and/or slowdowns begin.

At 102 method 100 includes determining, by a network controller, packet congestion on a network path using an IPDM. Packet congestion, as used herein, includes the queuing of packets within a network path. For instance, if packets are sent faster than a network path can handle, the packets are queued along the path until they are able to pass through the network path. The network controller will be discussed further herein with respect to FIGS. 3 and 4. Method 100 may be performed by a network controller such as network controllers 342, 442.

An IPDM is a mechanism used to determine packet indicating the beginning of congestion of the network path. Bandwidth measurement techniques such as probing (e.g., active or passive) rely on IPDM. Active probing includes an end-to-end network path estimation in which a device at one end of a network path (sender) sends special probe packets to a device at the other end of the network path (receiver). Those packets are used to estimate bandwidth and do not carry data beyond a data payload used for the network path estimation itself. Passive probing includes measuring delays experienced by existing data transmitted on the network path or modulating data to have specific characteristics. Another variation is single-ended measurement where the technique uses some way to get probe packets reflected back from the receiver to the sender.

Different bandwidth measurement techniques estimate different properties of the network path. For example, network bandwidth estimation is a subset of network path estimation. Path capacity is a threshold amount of network traffic bandwidth that can be sent if the network path is idle (e.g., without competing network traffic). Available network bandwidth is the remaining/residual path capacity (e.g., the capacity not currently used by ongoing traffic). Bulk transfer capacity is the network bandwidth a transmission control protocol connection would get if placed on the network path, latency is the OWD from sender to receiver, and round-trip time is the two-way delay.

With active probing, the sender sends a series of specially crafted probe packet patterns, the packet pattern is defined by the estimation technique and designed to trigger specific behaviors from the network elements on the network path. For example, in some instances the packet pattern is a probe train, such that the packets and interval between consecutive packets are intended to probe various bandwidths across the packet pattern. The receiver measures the received time of the packets, computes the OWD and/or other properties of each packet, and examines the changes to the packets across packet pattern. The estimation technique uses a simplified network model to convert those measurements into estimates of various network path characteristics.

Figure 2:
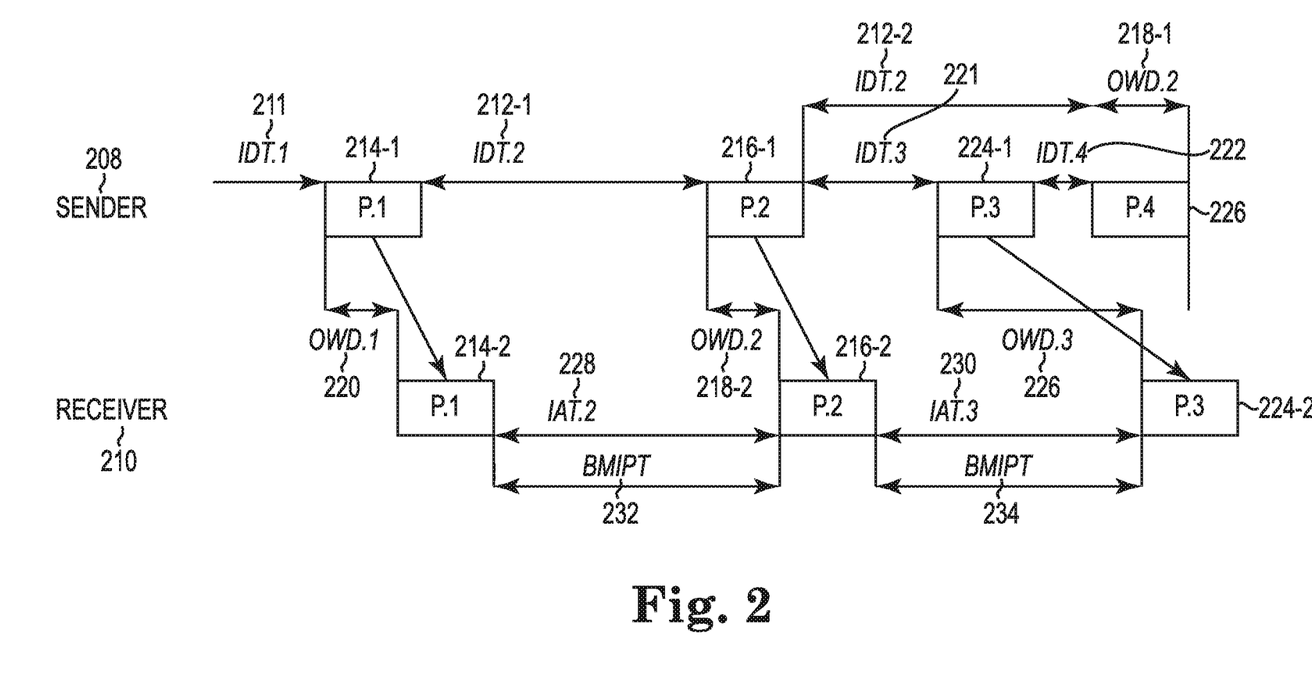
FIG. 2 illustrates an example of a packet flow sequence of a particular packet pattern for determination of an inflection point in congestion of a network path consistent with the disclosure.

An IPDM analyzes the OWD of packets by comparing the OWD of a packet to the OWD of a previous packet. As noted above, OWD includes the time taken by a packet to get from sender device to receiver device in a network path. The OWD can be absolute or relative. An absolute OWD is an actual measurement of the OWD of the packets. A relative OWD may be used instead of an absolute OWD, as an absolute OWD may be more difficult to accurately measure based on differences in sender and receiver clocks. A relative OWD includes the measured OWD of a current packet minus the measured OWD of a previous packet sent through the network path. If there are no packet losses and no packet reordering, packets are sent and received in the same order. In such an example, the inter arrival time (IAT), IDT, and OWD of each packet are related. For instance, if OWDp is the OWD of a previous packet, and OWDc is the OWD of a current packet, the following is true:

$$IAT = OWDc - OWDp + IDT,$$

where IAT is an amount of time between receiving a previous packet and a current packet at the receiver. In some examples, for each packet, the OWD is measured, along with a time difference between when the packet was sent ("sent time") and when the packet was received ("received time"), for instance, as illustrated with respect to FIG. 2 which will be further described herein.

The IPDM determines packet congestion in a network path when an increase in OWD in the probe train is present. The IPDM uses OWD increases to detect temporary congestion and full congestion. Temporary congestion may be a queue that is cleared within a threshold time period (e.g., 5 milliseconds), while full congestion may be a queue that is not be cleared with the threshold time period. Usually full congestion is being detected by network path characteristic estimation mechanism.

In response to a determination of packet congestion, method 100, at 104, includes detecting, by the network controller, a potential inflection point in response to a one-way delay (OWD) of a first packet being lesser than an OWD of a second packet by a quantity greater than a function of a difference of IDT between the first packet and the second packet. For instance, the IPDM will consider a packet as a potential inflection point only if the OWD increase is greater than a slope filter based on the packet's IDT. As used herein, a slope filter includes a particular factor (e.g., an α condition discussed further herein) multiplied by a difference between an IDT of a current packet and an IDT of a previous packet As used herein, IDT includes the amount of time between sending a previous packet (e.g., immediately previous packet) and sending a current packet. The IDT can be computed from a desired probing rate:

$$IDT = packet\ size/probed\ rate$$

The probing rate includes how fast packets are sent (or desired to be sent) during active probing. A sender may not be completely accurate in sending packets, so an actual IDT of the packet may be different from a desired IDT. Examples of the present disclosure can use the desired IDT or the actual IDT. In some instances, measurements of packets received are taken.

As used herein, a potential inflection point is a point in a sequence of OWD measurements wherein the OWD trend has or shows the capacity to become or develop into an inflection point. For example, an inflection point is a point of threshold change of OWD between packets. For instance, it may be a point at which the OWD begins to increase or decrease between packets by a threshold amount. For instance, the threshold amount is a point at which the OWD of a first packet is lesser than an OWD of a second packet by a quantity greater than a function of a difference of IDT between the first packet and the second packet. For instance, a potential inflection point occurs when:

$$OWDc-OWDp > \alpha(IDTp-IDTc),$$

where IDTp is an IDT of a previous packet, IDTc is an IDT of a current packet, and a is a condition. $\alpha$ can be a variable or a function.

When $\alpha=0$, a result is the same as an IPDM that does not consider IDT, and $\alpha=1$ is strict, forcing a selection of packets into full congestion. In some examples, $\alpha=0.5$ allows a bottleneck minimum inter packet time (BMIPT) to be within mid-range between IDTc and IDTp. The BMIPT, which will be discuss further herein, is determined by dividing a packet size by a bottleneck available bandwidth (BAB). A bottleneck is a phenomenon where the performance of a network is limited because not enough bandwidth is available to ensure that data packets in the network reach their destination in a timely manner. BAB sets an upper limit on how quickly the network can deliver the sender's data to the receiver. Available network bandwidth cannot exceed BAB. In some instances, detecting the potential inflection point includes the network controller filtering OWD measurement data prior to detection the potential inflection point. For example, a packet with an undesirable IDT can be removed from a set of packets, the OWD can be smoothed out (e.g., averaged), or if packet batching mitigation is used, a single packet per probe segment is selected. However, even after such filtering, remaining OWD measurement noise can trigger detection of potential inflection points if an IDT slope filter as described herein is not used. Due to noise, delay experienced by packet in a non-congested part of a network might increase and/or decrease instead of staying constant. By introducing the a condition, the OWD measurement data is filtered of its noise that causes inaccuracy.

In some examples, detecting the potential inflection point includes multiplying the function of the differences of IDT between the first packet and the second packet by a plurality of packets having a same desired IDT of the second packet prior to the second packet and including the second packet. Multiplying the function of the differences includes multiplying the difference by a predetermined factor (e.g., a factor between 0 and 1 such as $\alpha$). Such an example may be used when the network path is susceptible to packet batching.

Packet batching occurs when packets in a queue are processed as a group instead of individually. This can impact the OWD of packets because earlier packets of the group have to wait for the group to be processed resulting in their OWD artificially inflating, whereas the last packet of the group waits least and has a lower OWD.

To address this, examples of the present disclosure send multiple packets per probe with the same IDT. A current packet Pc within the probe has a packet probe index (ppi). There are (ppi−1) packets before Pc in a same probe. The ppi packets can be sent at interval IDTc, and the packets of a previous prove can be sent with interval IDTp. In congestion, each packet increases the wait time by the difference of BMIPT and IDTc, leaving:

$$WAITc=Backlog+ppi*(BMIPT-IDTc) > ppi*(IDTp-IDTc).$$

where WAITc indicates a current wait and Backlog indicates a backlog rate. For packet batching, the following condition can be used for determining a potential inflection point:

$$OWDc-OWDp > \alpha(ppi*(IDTp-IDTp)),$$

where $\alpha$ is a variable condition or a function.

In some instances, the potential inflection point is detected in response to the OWD of the second packet being greater than and OWD of the first packet by a quantity greater than a function of a difference of IDT between the second packet and a third packet responsive to the IDT of the first packet being erroneous. The third packet, for instance, can be a packet sent through the network path after the second packet.

In such an example, an IDT of a previous packet may not be used. For instance, when using the actual IDT, the IDT of the previous packet may be erroneous. When the IDT of the probe train is exponentially decreasing, an IDT of the next packet can be used. For instance, Pn is the next packet received after Pc. If the IDT is exponentially decreasing, then:

$$IDTp-IDTc > IDTc-IDTn,$$

and the following condition may be used:

$$OWDc-OWDp > \alpha(IDTc-IDTn),$$

where $\alpha$ is a variable condition (e.g., between and inclusive of 0 and 1) or a function.

At 106, method 100 includes determining, by the network controller, an inflection point in congestion of the network path based on the potential inflection point. For instance, based on the potential inflection point or points detected, an inflection point can be determined. In some examples, if only one potential inflection point is detected, that point is used as the inflection point. If a plurality of potential inflection points is detected, they may be filtered. For instance, if a potential inflection point is deemed too small (e.g., below a threshold, smaller compared to other detected potential inflection points, etc.) it may be filtered out from the other potential inflection points (e.g., ignored).

In some examples, available network bandwidth associated with the network path is determined by the network controller based on the inflection point determination. The plurality of potential inflection points can be used to identify an excursion, and the available network bandwidth associated with the network path can be determined based on the inflection point determination and the excursions identified. An excursion may start with a point showing increasing delay, continue until it returns to its starting point, and end before a new increasing delay is detected. As used herein, the available network bandwidth is the network path's unused capacity. Knowing the inflection point allows for a determination of when network traffic congestion occurs and at what point the congestion is triggered. Congestion may suggest no available network bandwidth. By knowing at what point (the inflection point) congestion occurs, a probe rate associated with the inflection point can be used to estimate the available bandwidth.

FIG. 2 illustrates an example of a network path for determination of an inflection point in congestion of a network path consistent with the disclosure. The network path can be probed by a train of probe packets in some instances. FIG. 2 illustrates sender 208 sending packets P.1 214, P.2 216, P.3 224, and P.4 226 to receiver 210. IDTs indicating an amount of time between sending a previous packet and the current packet are illustrated as IDT.1 211, IDT.2 212, IDT.3 221, and IDT.4 222. OWDs for various packets are illustrated as OWD.1 220, OWD.2 218-2, and OWD.3 226.

In the example illustrated in FIG. 2, the packets P.1 214, P.2 216, P.3 224, and P.4 226 are sent at an increasing rate and a decreasing IDT. When the IDT of packets is greater than a BMIPT, a bottleneck has time to fully send the previous packet before the current packet arrives, and therefore no queuing occurs, and the OWD is nearly constant. For instance, OWD.1 220 and OWD.2 218-2 are the same, indicating there is no queuing of packets. In addition, because IDT.2 212-1 is larger than BMIPT 232, no queuing occurs.

However, when IDT is smaller than BMIPT, packets arrive faster than they can be sent, and they are queued. The packets wait for the bottleneck to finish sending the previous packet, and due to the queuing, those packets see increasing OWDs. For instance, IDT.3 221 and IDT.4 222 are smaller than IDT.2 212-1. Additionally, because both IDT.3 221 and IDT.4 222 are smaller than BMIPT 234, queueing occurs, indicated by an increased OWD.3 226 as compared to OWD.1 220 and OWD.2 218-2. IDT.2 212-2 and OWD.2 218-1 illustrate that without P.3 224-1, IDTs and OWDs would remain constant. However, with the increase in rate at which the packets are sent, IDTs decrease, queuing occurs, and OWDs increase. Using these IDTs and OWDs, an inflection point in congestion can be determined for the network path. For instance, $$(OWD.3 - OWD.2) > \alpha(IDT.3 - IDT.2),$$

where $\alpha$ is a variable condition (e.g., 0.5) or a function, can indicate a potential inflection point.

Figure 3:
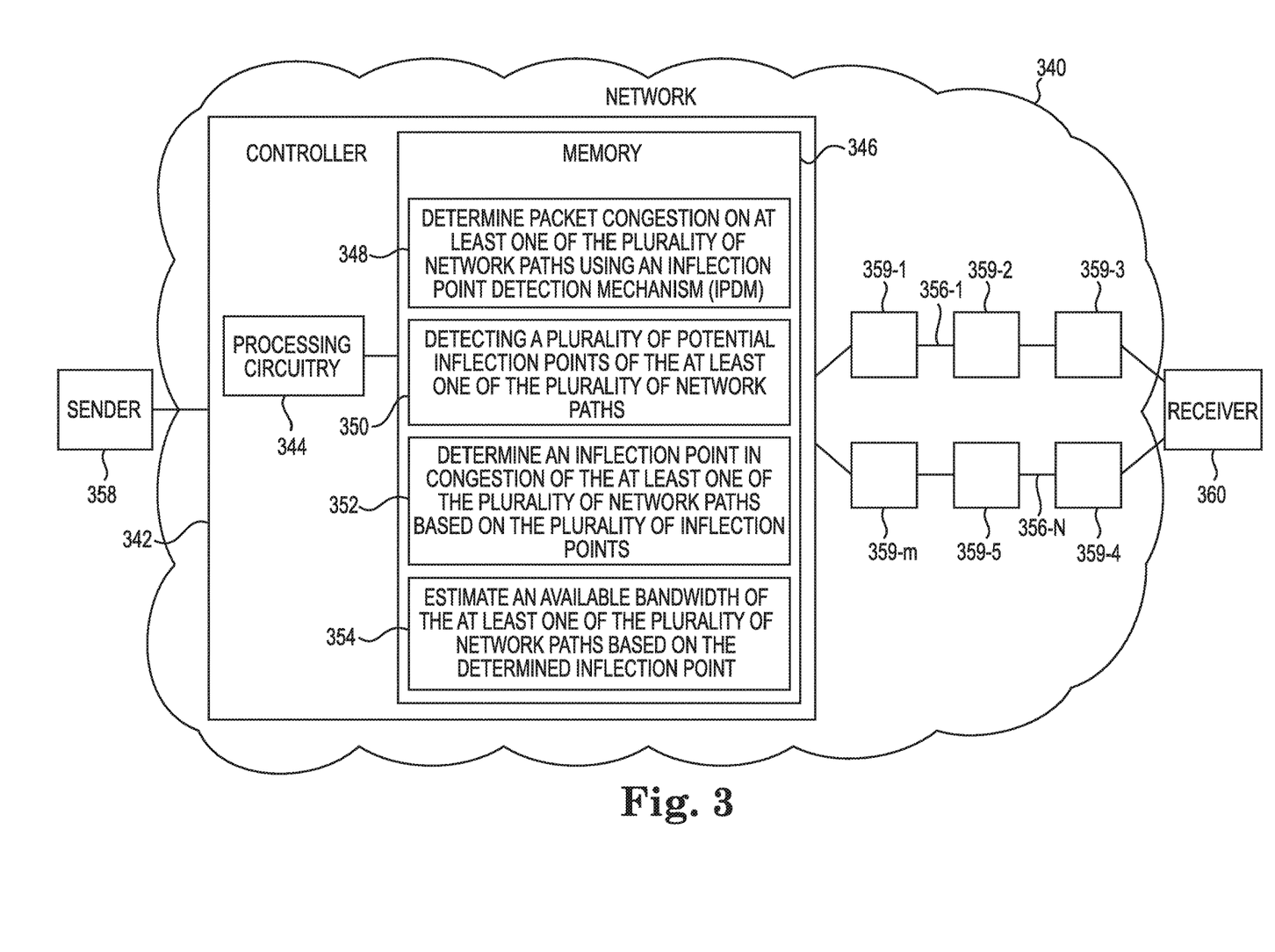
FIG. 3 illustrates an example of a network comprising a network controller and network paths for determination of an inflection point in congestion of a network path consistent with the disclosure.

FIG. 3 illustrates an example of a network 340 comprising a network controller 342 and network paths 356-1, 356-N for determination of an inflection point in congestion of a network path consistent with the disclosure. Network 340 can include, for instance an SD-WAN, a LAN, a WLAN, a VPN, the Internet, or the like, or a combination thereof. Network paths 356 include a sender 358 and a receiver 360. Packets are sent between the sender 358 and the receiver 360 to estimate available bandwidth of each of the network paths 356. While two network paths 356 are illustrated in FIG. 3, more or fewer network paths 356 may be present in network 340. A network path, as used herein, includes an internet or other path using network links to carry network traffic across the network (e.g., network 340).

Along network paths 356 are network devices 359-1, 359-2, . . . , 359-m. More or fewer network devices may be present along network paths 356. As illustrated in FIG. 3, the network controller 342 includes processing circuitry 344 and a memory 346. Network controller, in some examples, includes a network bandwidth estimator and can be implemented on a network device and/or node or can be a network device. The processing circuitry 344 may be a hardware processing unit such as a microprocessor, microcontroller, application specific instruction set processor, coprocessor, network processor, or similar hardware circuitry that may cause machine-readable instructions to be executed. In some examples, the processing circuitry 344 may be a plurality of hardware processing units that may cause machine-readable instructions to be executed. The processing circuitry 344 may include central processing units (CPUs) among other types of processing units. The memory 346 may be any type of volatile or non-volatile memory or storage, such as random-access memory (RAM), flash memory, read-only memory (ROM), storage volumes, a hard disk, or a combination thereof.

The memory 346 stores instructions thereon, such as instructions 348, 350, 352, and 354. When executed by the processing circuitry 344, the instructions cause the network controller 342 to perform specific tasks and/or functions. For example, the memory 346 stores instructions 348 which are executed by the processing circuitry 344 to cause the network controller 342 to determine packet congestion on at least one of the plurality of network paths 356 using an IPDM. For instance, the IPDM determines packet congestion in a network path when an increase in OWD between packets is present. The IPDM uses OWD increases to detect temporary congestion and full congestion.

In some examples, a plurality of packets having a same desired IDT are sent through the at least one of the plurality of network paths 356 to overcome an effect of packet batching. For instance, a source of bandwidth measurement noise is packet batching, which occurs when packets are processes as a group instead of individually. As noted above with respect to FIG. 1, packets in a probe can be sent together with a same desired IDT, and a condition for potential inflection point that considers packet batching can be used. For instance, the condition can include an $\alpha$ condition and a ppi.

In some examples, the memory 346 stores instructions 350 which are executed by the processing circuitry 344 to cause the network controller 342 to detect a plurality of potential inflection points of the at least one of the plurality of network paths 350. This detection can be in response to an OWD of a first packet of the at least one of the plurality of network paths 356 being lesser than an OWD of a second packet of the at least one of the plurality of network paths 356 by a quantity greater than a function of a difference of IDT between the first packet and the second packet. Additionally or alternatively, the detection can be in response to multiplication of the function of the difference of IDT between the first packet and the second packet by a plurality of packets having a same desired IDT of the second packet prior to the second packet and including the second packet (e.g., when reducing the effects of packet batching).

The first packet, second packet, and third packet, in this example, are sent sequentially (e.g., second packet sent after first packet, third packet sent after second packet, etc.). The sequential order may occur in a same network path or different network paths of the plurality of network paths 356. In some instances, the order of the packets sent may be different and/or vary.

In some examples, the memory 346 stores instructions 352 which are executed by the processing circuitry 344 to cause the network controller 342 to determine an inflection point in congestion of the at least one of the plurality of network paths 356 based on the plurality of potential inflection points. For instance, each one of the plurality of network paths 356 may have its own inflection point. The inflection points may have a same or different value between network paths. The inflection points may be one of the potential inflection points determined for each of the plurality of network paths 356. For instance, an inflection point for a particular network path may be a potential inflection point determined for that particular network path that is above a threshold amount (e.g., a particular increase amount, largest of the plurality of potential inflection points, etc.). In some instances, OWD measurement noise may be filtered prior to detection of the plurality of potential inflection points.

In some examples, the memory 346 stores instructions 354 which are executed by the processing circuitry 344 to cause the network controller 342 to estimate an available bandwidth of the at least one of the plurality of network paths 356 based on the determined inflection point. For instance, knowledge of the inflection point reveals the point at which more network traffic cannot be sent through the network path without queuing. This can indicate the point at which network bandwidth is no longer available.

In some instances, packet transmission is adjusted based on the estimated available bandwidth. For example, adjusting packet transmission can include load-balancing traffic through the at least one of the plurality of network paths 356 or redirecting a portion of traffic through the at least one of the plurality of network paths 356, among others. Put another way, network 340 can be reconfigured to implement desired distribution of network traffic based on the estimated available bandwidth of plurality of network paths between a sender and receiver.

Figure 4:
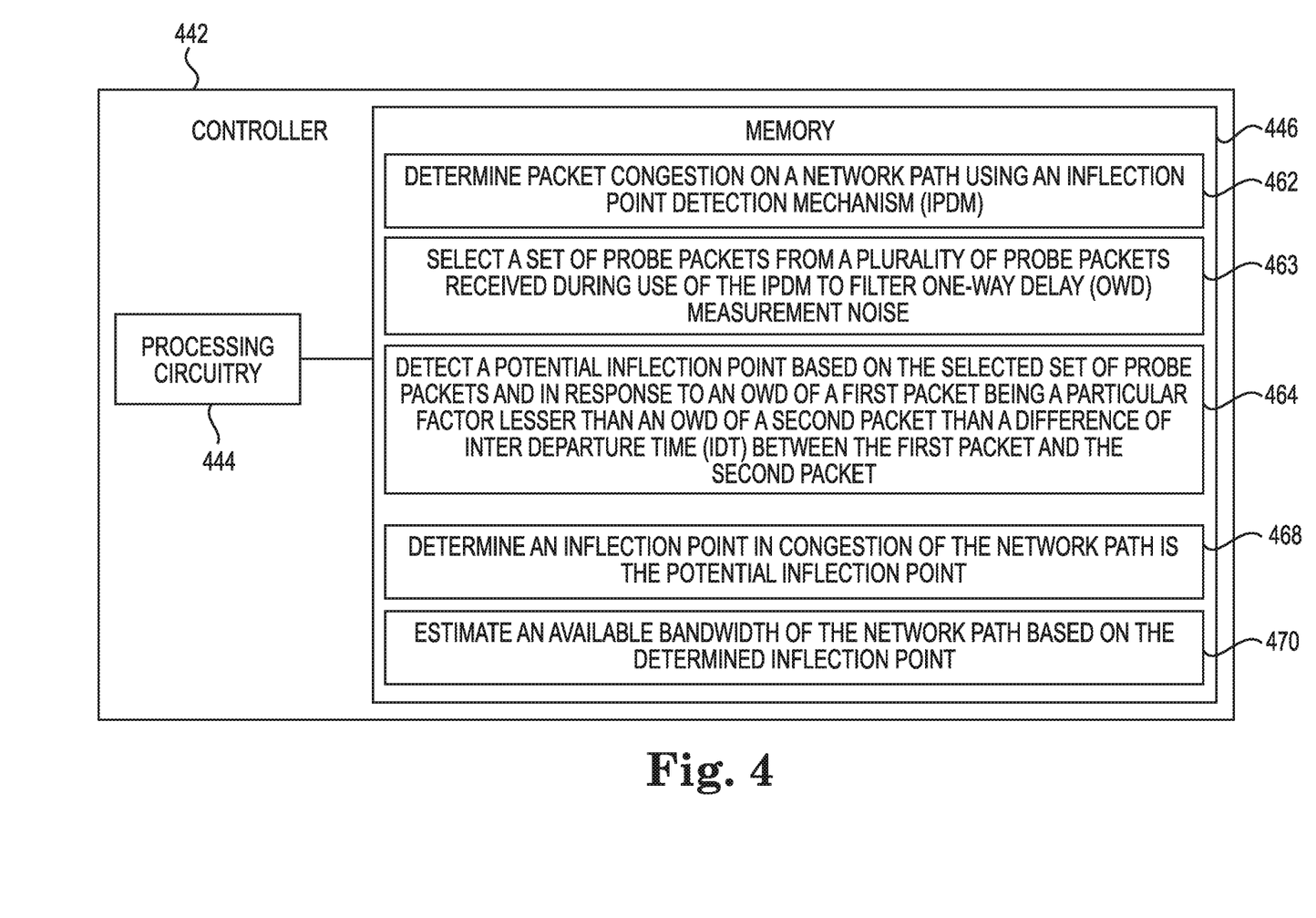
FIG. 4 illustrates an example of a network controller including a memory and processing circuitry for determination of an inflection point in congestion of a network path consistent with the disclosure.

FIG. 4 illustrates an example of a network controller 442 including a memory 446 and processing circuitry 444 for determination of an inflection point in congestion of a network path consistent with the disclosure. The network controller 442, in some examples, is analogous to network controller 342 discussed with reference to FIG. 3. Network controller 442 includes processing circuitry 444 and a memory 446. The memory 446 stores instructions thereon, such as instructions 464, 466, 468, and 470. When executed by the processing circuitry 444, the instructions cause the network controller 442 to perform specific tasks and/or functions.

For example, the memory 446 stores instructions 462 which are executed by the processing circuitry 444 to cause the network controller 444 to determine packet congestion on a network path using an IPDM. For instance, the IPDM determines packet congestion in a network path when an increase in OWD between packets is present. The IPDM uses OWD increases to detect temporary congestion and full congestion.

In some examples, the memory 446 stores instructions 463 which are executed by the processing circuitry 444 to cause the network controller 444 to select a set of probe packets from a plurality of probe packets received during use of the IPDM to filter OWD measurement noise. After such filtering, however, remaining OWD measurement noise can trigger detection of potential inflection points if an IDT slope filter as described herein is not used. Due to noise, OWD increase and decrease in a non-congested part of a network path may occur instead of staying constant. By introducing the a condition, the OWD measurement data is filtered of its noise that causes inaccuracy.

In some examples, the memory 446 stores instructions 464 which are executed by the processing circuitry 444 to cause the network controller 444 to detect a potential inflection point in response to an OWD of a first packet being a particular factor lesser than an OWD of a second packet than a difference of IDT between the first packet and the second packet. The first packet is a packet sent through the network path prior to the second packet. In some examples, detecting the potential inflection point includes detecting the potential inflection point in response to an OWD of the first packet being a particular factor (e.g., between and inclusive of 0 and 1) lesser than an OWD of the second packet as compared to a difference of IDT between the first packet and the second packet. The particular factor, for instance, can include an a condition, which may be a variable condition or a function.

The IDT can include an actual IDT or a desired IDT. For instance, the difference of IDT is a difference of actual IDT or a difference of desired IDT between the first packet and the second packet. An actual IDT may be measured, and a desired IDT may be determined or computed based on a desired probing rate.

In some examples, the memory 446 stores instructions which are executed by the processing circuitry 444 to cause the network controller 444 to detect a different potential inflection point in response to an OWD of a third packet being the particular factor lesser than an OWD of a fourth packet than a difference of IDT between the third packet and the fourth packet. The third packet is a packet sent through the network path prior to the fourth packet Similar to the aforementioned potential inflection point, detecting the different potential inflection point includes detecting the potential inflection point in response to an OWD of the third packet being a particular factor lesser than an OWD of the fourth packet as compared to a difference of IDT between the third packet and the fourth packet. The particular factor, for instance, can include an α condition, which may be a variable condition or a function.

In some examples, the memory 446 stores instructions 468 which are executed by the processing circuitry 444 to cause the network controller 444 to determine an inflection point in congestion of the network path based on the potential inflection point. For instance, the inflection point is determined in congestion of the network path to be the potential inflection point. In examples where two potential inflection points are detected, the potential inflection points are filtered. For instance, if the potential inflection point is deemed too small (e.g., below a threshold, smaller compared to other detected potential inflection, etc.) it may be filtered out from the other potential inflection points (e.g., ignored). In this example, the different potential inflection point becomes the inflection point.

In some instances, determining the inflection point includes filtering OWD measurement noise. For example, when no a condition is considered, OWD measurement data can trigger detection of potential inflection points. Due to noise, OWD increase and decrease in a non-congested part of a network path may occur instead of staying constant. By introducing the a condition, the OWD measurement data is filtered of its noise that causes inaccuracy.

In some examples, the memory 446 stores instructions 470 which are executed by the processing circuitry 444 to cause the network controller 444 to estimate an available bandwidth of the network path based on the determined inflection point. The inflection point can be used to determine a threshold rate at which packets may be sent through the network path before congestion occurs. This information is used to determine an estimated available network path bandwidth. In some examples, potential inflection points can be used to identify an excursion, and the available network bandwidth associated with the network path can be determined based on the inflection point determination and the excursions identified.

In some instances, packet transmission is adjusted based on the estimated available bandwidth. For example, adjusting packet transmission can include load-balancing traffic through the network path or redirecting a portion of traffic through the network path (or a different network path), among others. A network hosting the network path can be reconfigured to implement desired distribution of network traffic based on the estimated available bandwidth.

Figure 5:
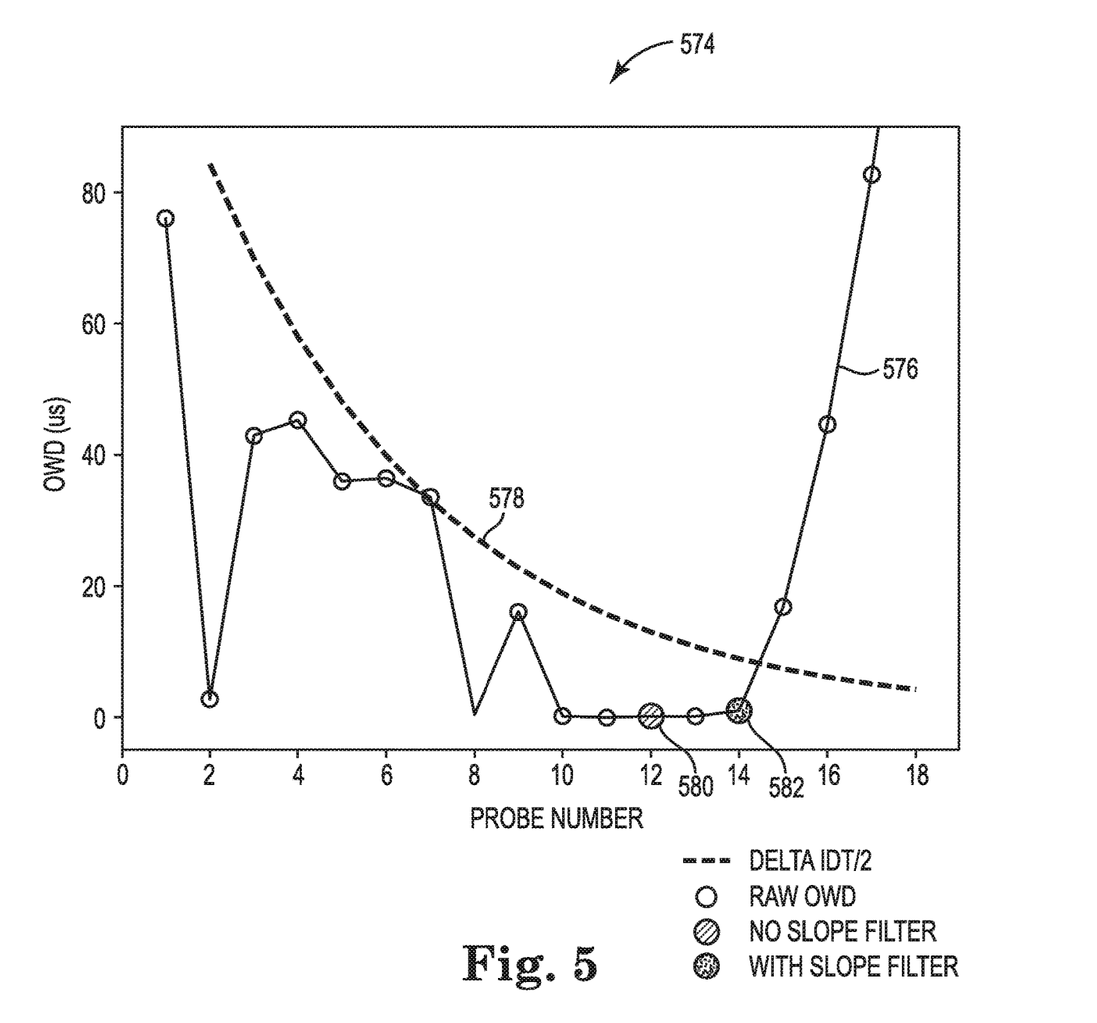
FIG. 5 illustrates a diagram including example inflection points consistent with the disclosure.

FIG. 5 illustrates a diagram 574 including example inflection points 580, 582 consistent with the disclosure. The y-axis of diagram 574 indicates the OWD between packets in microseconds, and the x-axis of diagram 574 indicates the probe number (pbn). The set of packets have already been filtered, and the pbn represents the ppi selected as input to the IPDM. Line 578 represents the slope filter and indicates a change in the IDT divided by 2 (or multiplied by $\alpha=0.5$). For instance, line 578 represents 0.5(IDTp–IDTc). Line 576 follows the OWDs between packets. Two inflection points 580 and 582 are indicated on diagram 574. Inflection point 580 represents an inflection point 580 that does not consider a slope filter (e.g., doesn't consider IDTs), but rather determines a potential inflection point and eventual inflection point based on an increase in OWD. For instance, between pbn 10 and pbn 12, the OWD increased resulting in a potential inflection point and determination of an inflection point.

However, taking into consideration the slope filter, at pbn 12, line 578 is still greater than the difference in OWD. It is not until pbn 14 at inflection point 582, that line 578 becomes greater than the difference in OWD. As such, the inflection point 580 and pbn estimate of 12 is an inaccurate estimate and an underestimation of network bandwidth. The more accurate estimate of inflection point 582 at pbn 14 may indicate more available bandwidth, which can improve the performance and function of the network and associated network devices, as well as improve user satisfaction. In such an example, costs may be reduced, as well, as additional bandwidth may not be needed, as opposed to an instance of underestimation.

As used herein, the designator "n", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

What is claimed is:

1. A method comprising
    determining, by a network controller, packet congestion on a network path using an inflection point detection mechanism (IPDM);
    detecting, by the network controller, a potential inflection point in response to a one-way delay (OWD) of a first packet being lesser than an OWD of a second packet by a quantity greater than a function of a difference of inter departure time (IDT) between the first packet and the second packet; and
    determining, by the network controller, an inflection point in congestion of the network path based on the potential inflection point.

2. The method of claim 1, further comprising estimating, by the network controller, available network bandwidth associated with the network path based on the inflection point determination.

3. The method of claim 1, further comprising filtering, by the network controller, OWD measurement noise prior to detecting the potential inflection point.

4. The method of claim 1, wherein, when an IDT of the first packet being erroneous, detecting the potential inflection point comprises:
    detecting the potential inflection point in response to the OWD of the second packet being greater than an OWD of the first packet by a quantity greater than a function of a difference of IDT between the second packet and a third packet.

5. The method of claim 1, wherein the difference of IDT comprises at least one of:
    a difference of actual IDT between the first packet and the second packet; and
    a difference of desired IDT between the first packet and the second packet.

6. A network, comprising:
    a plurality of network paths; and
    a network controller communicatively coupled to the plurality of network paths, comprising processing circuitry and memory including instructions that, when executed by the processing circuitry, cause the processing circuitry to:
        determine packet congestion on at least one of the plurality of network paths using an inflection point detection mechanism (IPDM);
        detect a potential inflection point of the at least one of the plurality of network paths in response to:
            a one-way delay (OWD) of a first packet of the at least one of the plurality of network paths being lesser than an OWD of a second packet of the at least one of the plurality of network paths by a quantity greater than a function of a difference of inter departure time (IDT) between the first packet and the second packet;
        determine an inflection point in congestion of the at least one of the plurality of network paths based on the plurality of inflection points; and
        estimate an available bandwidth of the at least one of the plurality of network paths based on the determined inflection point.

7. The network of claim 6, further comprising the instructions to adjust packet transmission through the at least one of the plurality of network paths based on the estimated available bandwidth.

8. The network of claim 6, further comprising instructions to filter OWD measurement noise prior to detection of the potential inflection point.

* * * * *